US009518692B2

(12) United States Patent
Kamiyama et al.

(10) Patent No.: US 9,518,692 B2
(45) Date of Patent: Dec. 13, 2016

(54) PIPE REHABILITATION METHOD

(71) Applicant: SHONAN GOSEI-JUSHI SEISAKUSHO K.K., Hiratsuga-shi, Kanagawa (JP)

(72) Inventors: Takao Kamiyama, Hiratsuka (JP); Makoto Ishida, Hiratsuka (JP); Takeshi Hasegawa, Hiratsuka (JP)

(73) Assignee: SHONAN GOSEI-JUSHI SEISAKUSHO K.K. (JP)

( * ) Notice: Subject to any disclaimer, the term of this patent is extended or adjusted under 35 U.S.C. 154(b) by 0 days.

(21) Appl. No.: 14/946,885

(22) Filed: Nov. 20, 2015

(65) Prior Publication Data
US 2016/0153603 A1 Jun. 2, 2016

(30) Foreign Application Priority Data
Dec. 2, 2014 (JP) ................................. 2014-243642

(51) Int. Cl.
F16L 55/165 (2006.01)
E03F 3/06 (2006.01)

(52) U.S. Cl.
CPC ........ F16L 55/165 (2013.01); E03F 2003/065 (2013.01)

(58) Field of Classification Search
CPC .. F16L 55/165; F16L 55/1655; F16L 55/1656; F16L 55/1657
USPC ................. 405/184.2, 151, 152, 153; 138/97
See application file for complete search history.

(56) References Cited

U.S. PATENT DOCUMENTS

| 3,695,044 A * | 10/1972 | Hoshino ................. E21D 5/012 277/654 |
| 4,497,590 A * | 2/1985 | Chase ..................... E21D 11/08 405/152 |
| 5,145,281 A * | 9/1992 | Molyneux ................. E03F 3/06 405/146 |
| 5,458,155 A * | 10/1995 | Stephens ................... E03F 3/06 138/157 |
| 6,089,279 A * | 7/2000 | Clarke ...................... E03F 3/06 138/157 |
| 6,554,536 B1 * | 4/2003 | Florence ............. F16L 55/1657 264/256 |
| 7,028,716 B2 * | 4/2006 | Kaneta .................. F16L 55/179 138/97 |
| 7,165,578 B2 * | 1/2007 | Kamiyama ............... E03F 3/06 138/98 |

(Continued)

OTHER PUBLICATIONS

IPO Search Report issued on May 16, 2016 in British Application No. GB 1520139.3.

Primary Examiner — Frederick L Lagman
(74) Attorney, Agent, or Firm — Adams & Wilks

(57) ABSTRACT

An existing pipe that is to be rehabilitated has concavely curved portions and straight portions as viewed in cross-section orthogonal to the longitudinal direction of the existing pipe. For pipe rehabilitation at the curved portion of the existing pipe, a plurality of rectangular parallelepiped segments whose inner surface plate, side plates and end plates are all rectangular are used. A spacer is interposed between the end plates of the rectangular parallelepiped segments. The spacer has first and second contact surfaces that are inclined relative to each other and come into contact with the end plates of the rectangular parallelepiped segments when they are linked in the circumferential direction.

3 Claims, 6 Drawing Sheets

(56) References Cited

U.S. PATENT DOCUMENTS

| | | | |
|---|---|---|---|
| 7,955,026 B2 * | 6/2011 | Kamiyama | E02D 29/12 405/133 |
| 8,191,580 B2 * | 6/2012 | Scott | F16L 9/22 138/120 |
| 8,360,108 B2 * | 1/2013 | Kamiyama | F16L 55/163 138/155 |
| 2005/0229986 A1 | 10/2005 | Kamiyama et al. | 138/97 |
| 2005/0238437 A1 | 10/2005 | Kamiyama et al. | 405/184.1 |
| 2005/0248157 A1 | 11/2005 | Kaneta et al. | 285/406 |
| 2005/0252565 A1 | 11/2005 | Kamiyama et al. | 138/98 |
| 2008/0105320 A1 | 5/2008 | Kamiyama et al. | 138/97 |
| 2010/0139799 A1 * | 6/2010 | Kamiyama | F16L 55/1651 138/98 |
| 2010/0307624 A1 | 12/2010 | Kamiyama et al. | 138/98 |
| 2013/0008549 A1 | 1/2013 | Sakurada et al. | 138/98 |
| 2013/0284298 A1 | 10/2013 | Kamiyama et al. | 138/98 |

\* cited by examiner

PIPE REHABILITATION METHOD

BACKGROUND OF THE INVENTION

1. Field of the Invention

The present invention relates to a pipe rehabilitation method for rehabilitating an existing pipe in which integrally formed plastic segments each comprising an inner surface plate constituting an inner circumferential surface, and side plates and end plates provided upright on peripheral edges of the inner surface plate are linked in the circumferential direction and in the pipe-length direction.

2. Description of the Related Art

In cases in which a sewage pipe or another pipeline buried underground has deteriorated through aging, a pipe lining method has been proposed and practiced in which a lining is provided to the inner circumferential surface thereof to repair the pipeline without excavating it from the ground.

In this pipe lining method, a pipe lining material made of a tubular resin absorbent material impregnated with an uncured thermosetting resin is everted and inserted into a pipeline using fluid pressure, and is pressed by fluid pressure against the inner peripheral wall of the pipeline. The lining material is then heated using a desired method to cure the thermosetting resin impregnated therein and form a plastic pipe, thereby repairing the pipeline.

There is also known a lining method using segments each comprising an inner surface plate constituting an inner circumferential surface, side plates and end plates provided upright on the peripheral edges of the inner surface plate, these plates being integrally formed from a plastic material.

The segments are linked in the circumferential direction to assemble short pipe units, which are then linked in the pipe-length direction to construct a rehabilitation pipe inside an existing pipe (for example, JP-A 2011-12803). Such a pipe rehabilitation method is used for large-diameter existing pipes. In this method, after assembling a rehabilitation pipe inside the existing pipe, grout or another filler material is injected into a space between the existing pipe and the rehabilitation pipe and hardened to construct a composite pipe.

When a rehabilitation pipe is to be installed in a construction site, there may be instances in which the diameter of the rehabilitation pipe must be made slightly larger than the standard size in order to compensate errors that have arisen in constructing the existing pipe or to match other structures. To this end, a diameter expander is inserted between the segments when they are linked in the circumferential direction to enlarge the diameter of the rehabilitation pipe (JP-A 2014-77261).

SUMMARY OF THE INVENTION

In cases where the existing pipe having a circular shape in cross-section is to be rehabilitated, an arc-shaped segment is used, which is obtained by equally dividing the circumference corresponding to the circle of the existing pipe. On the other hand, in cases where the existing pipe having a rectangular shape in cross-section is to be rehabilitated, a segment having a rectangular parallelepiped shape is used for four sides of the rectangle, and a curved segment that is bent depending on the shape of the existing pipe is used for four corners thereof.

When an existing pipe has a portion curved with a given curvature, a standardized arc-shaped segment that meets the curvature can be used to rehabilitate the curved existing pipe. However, manufacturing arc-shaped segments that match in curvature for every different curvature would increase costs.

In cases where no arc-shaped segment that matches to the curvature of the curved portion of the existing pipe is available, a standardized arc-shaped segment is used which has an approximate curvature. This would be disadvantageous because a space relative to the existing pipe varies as the arc-shaped segments are linked in the circumferential direction. Instead, a diameter expander as proposed in JP-A 2014-77261 can be used to link the segments in the circumferential direction. However, JP-A 2014-77261 proposes to enlarge the diameter of the pipe unit that is assembled by linking the segments in the circumferential direction, but it doesn't propose to match different curved portions of the existing pipe.

It is therefore an object of the invention to provide a pipe rehabilitation method capable of rehabilitating curved portions of an existing pipe, effectively and at low cost.

The present invention provides a method for rehabilitating an existing pipe having a curved portion as viewed in cross-section orthogonal to the longitudinal direction of the existing pipe. The method comprises preparing a plurality of segments each comprising an inner surface plate, and side plates and end plates provided upright on a peripheral edge of the inner surface plate, the inner surface plate, the side plates, and the end plates being formed integrally from a plastic material; and linking the segments in a circumferential direction and in a pipe-length direction to assemble a rehabilitation pipe inside the existing pipe. For pipe rehabilitation at the curved portion of the existing pipe, a plurality of rectangular parallelepiped segments whose inner surface plate, side plates and end plates are all rectangular are used, and a spacer is interposed between the end plates of the rectangular parallelepiped segments when they are linked in the circumferential direction.

According to the present invention, for pipe rehabilitation at the curved portion of the existing pipe, a plurality of rectangular parallelepiped segments are linked in the circumferential direction with a spacer interposed between the end plates thereof, so that the curved portion of the existing pipe can be rehabilitated effectively and at low cost.

Further features of the invention, its nature and various advantages will be more apparent from the accompanying drawings and following detailed description of the invention.

DESCRIPTION OF THE PREFERRED EMBODIMENTS

The present invention will now be described with references to embodiments illustrated in the accompanying drawings. The present invention is suitable for rehabilitating or repairing existing large-diameter pipes such as sewage pipes, water supply pipes, tunnels, agricultural irrigation channels, and the like. In the present embodiment, the existing pipe is described as having curved portions and straight portions as viewed in cross-section orthogonal to the pipe-length direction. However, it shall be apparent that the present invention can be applied to an existing pipe having another profile. Also, in addition to structures in which the cross-section profile is closed as a pipe, a structure having a horseshoe-shaped, semi-circular, U-shaped, or another cross-section profile in which one side is open can also be considered to be a pipe, and the present invention can also be applied thereto.

In the present specifications, the pipe-length direction refers to the direction extending in the longitudinal direction of an existing pipe or a rehabilitation pipe, and the circumferential direction refers to the direction of the circumference of a closed curve that the existing pipe or the rehabilitation pipe draws in cross-section orthogonal to the pipe-length direction.

Figure 1:
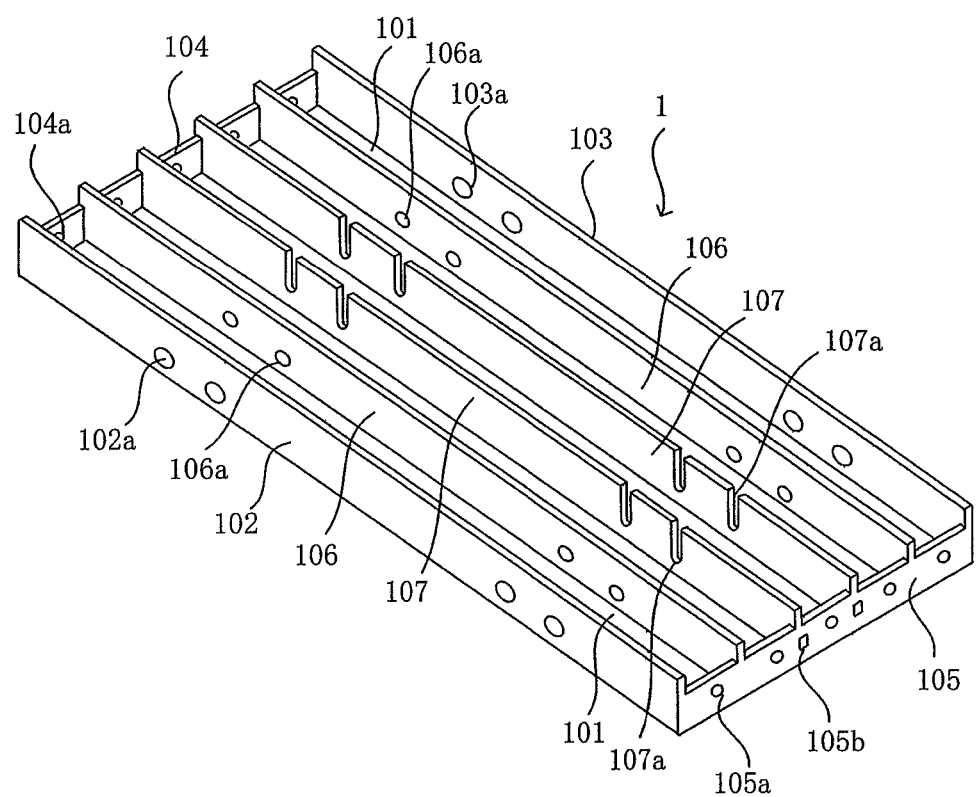
FIG. 1 is a perspective view showing the structure of a segment used in assembling the rehabilitation pipe.

FIG. 1 shows the structure of a segment 1 for pipe rehabilitation (hereafter simply referred to as "segment"), which represents an assembly unit member of a rehabilitation pipe for rehabilitating an existing pipe. The segment 1 is an integrally formed block-shaped member made from a plastic material, comprising an inner surface plate 101 constituting an inner circumferential surface of the rehabilitation pipe, side plates 102, 103 provided upright vertically relative to the inner surface plate on both sides extending in the circumferential direction of the inner surface plate 101, and end plates 104, 105 provided upright vertically relative to the inner surface plate on both ends extending in the pipe-length direction of the inner surface plate 101.

The segment 1 has a rectangular parallelepiped shape, and the inner surface plate, the side plates and the end plates thereof are all rectangular (parallelogram-shaped). However, depending on the cross-section profile of the existing pipe, the segment may have a shape that is curved as an arc representing a predetermined angle that equally divides the circumference, e.g., a 60° arc that divides the circumference into sixths, as described in JP-A 2014-77261, or the segment may have a shape that is bent so as to have a curved right angle.

A plurality (four in the present embodiment) of inner plates 106, 107 having a shape similar to that of the side plates are provided upright at equal intervals and parallel to the side plates 102, 103 on the upper surface of the inner surface plate 101 and on the inside relative to the side plates 102, 103 in order to reinforce the mechanical strength of the segment 1.

The inner surface plate 101, the side plates 102, 103, the end plates 104, 105, and the inner plates 106, 107 are all made from an identical transparent, semi-transparent or opaque plastic material, and are integrally formed using a known molding technique.

The side plate 102, the side plate 103 and the inner plates 106 are provided with a plurality (four) of insertion holes 102a, 103a, 106a for admitting insertion of a liking member for linking the segment 1 in the pipe-length direction, and the inner plates 107 are also provided with a plurality (four) of notches 107a for admitting insertion of the liking member.

Figure 2A:
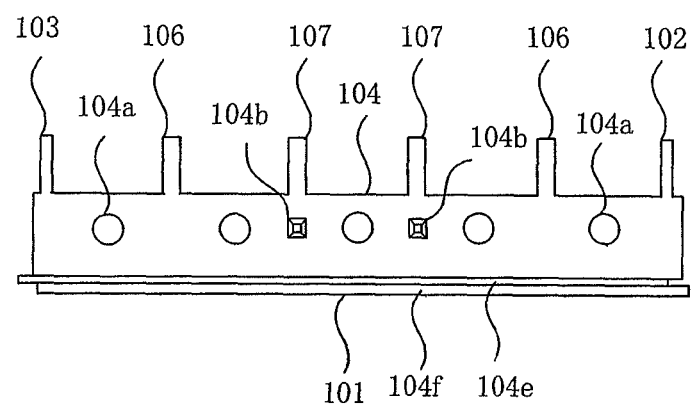
FIG. 2a is a front view of one end plate of the segment shown in FIG. 1.

The end plate 104 is disposed between the side plate 102 and the side plate 103, and is, as shown in FIG. 2a, provided with a plurality (five) of circular insertion holes 104a for admitting insertion of a bolt or another linking member for linking the segment 1 in the circumferential direction. The end plate 104 is also provided with two concave sections 104b that fit into corresponding convex sections of a spacer as described below.

Furthermore, a concave section 104e and a convex section 104f that fit into a convex section and a concave section of the spacer are formed at the lower portion of the end plate 104 along the entire length in the pipe-length direction.

Figure 2B:
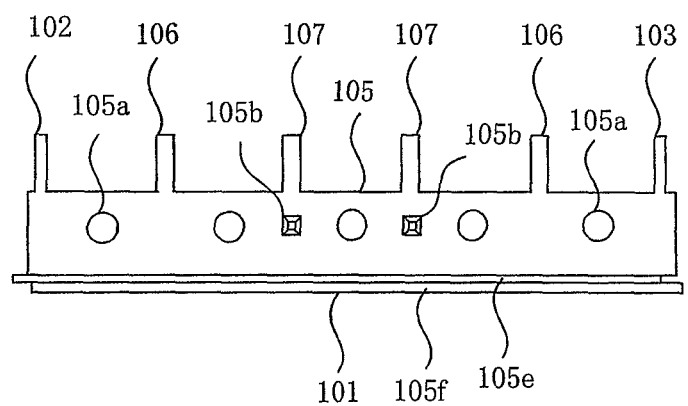
FIG. 2b is a front view of the other end plate thereof.

The end plate 105 has a shape similar to that of the end plate 104, as shown in FIG. 2b, and is disposed between the side plate 102 and the side plate 103. The end plate 105 is provided with a plurality (five) of circular insertion holes 105a for admitting insertion of the linking member, and with two convex sections 105b that fit into corresponding concave sections of the spacer. Furthermore, a convex section 105e and a concave section 105f that fit into a concave section and a convex section of the spacer are formed at the lower portion of the end plate 105 along the entire length in the pipe-length direction.

Figure 3A:
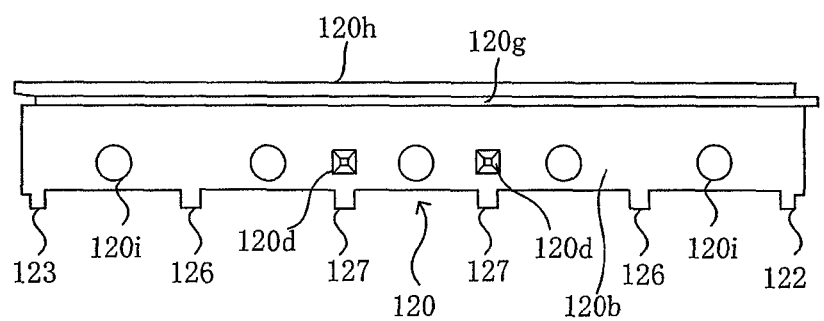
FIG. 3a is a front view of a spacer.
Figure 3B:
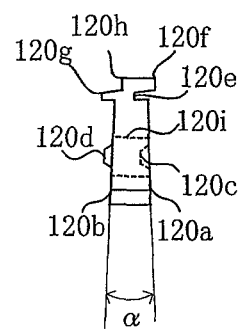
FIG. 3b is a side view thereof.

FIGS. 3a and 3b show a spacer 120 that is used for pipe rehabilitation performed using the rectangular parallelepiped segment 1 at a curved portion of an existing pipe. The spacer 120 is made from a material similar to that of the segment 1, and has a contact surface 120a that comes into contact with the end plate 105 of the segment 1 and an opposite contact surface 120b that comes into contact with the end plate 104 thereof, both the contact surfaces 120a and 120b being inclined relative to each other such that both intersect at an angle of a. The spacer 120 is provided at its lower surface with protrusions 122, 126, 127 and 123, whose position respectively coincides with that of the side plate 102, the inner plates 106, 107, and the side plate 103 of the segment 1 in the pipe-length direction, and is also provided with a plurality of insertion holes 120i that respectively correspond to the insertion holes 104a, 105a of the end plates 104, 105 of the segment 1.

The spacer 120 is further provided at the contact surface 120a with two concave sections 120c that respectively fit into the convex section 105b formed at the end plate 105 of the segment 1, and at the contact surface 120b with two convex sections 120d that respectively fit into the concave section 104b formed at the end plate 104 thereof. Furthermore, a concave section 120e and a convex section 120f that fit into the convex section 105e and the concave section 105f formed at the end plate 105 of the segment 1 are formed at the upper portion of the contact surface 120a along the entire length in the pipe-length direction, and a convex section 120g and a concave section 120h that fit into the concave section 104e and the convex section 104f formed at the end plate 104 of the segment 1 are formed at the upper portion of the contact surface 120b along the entire length in the pipe-length direction.

Figure 4:
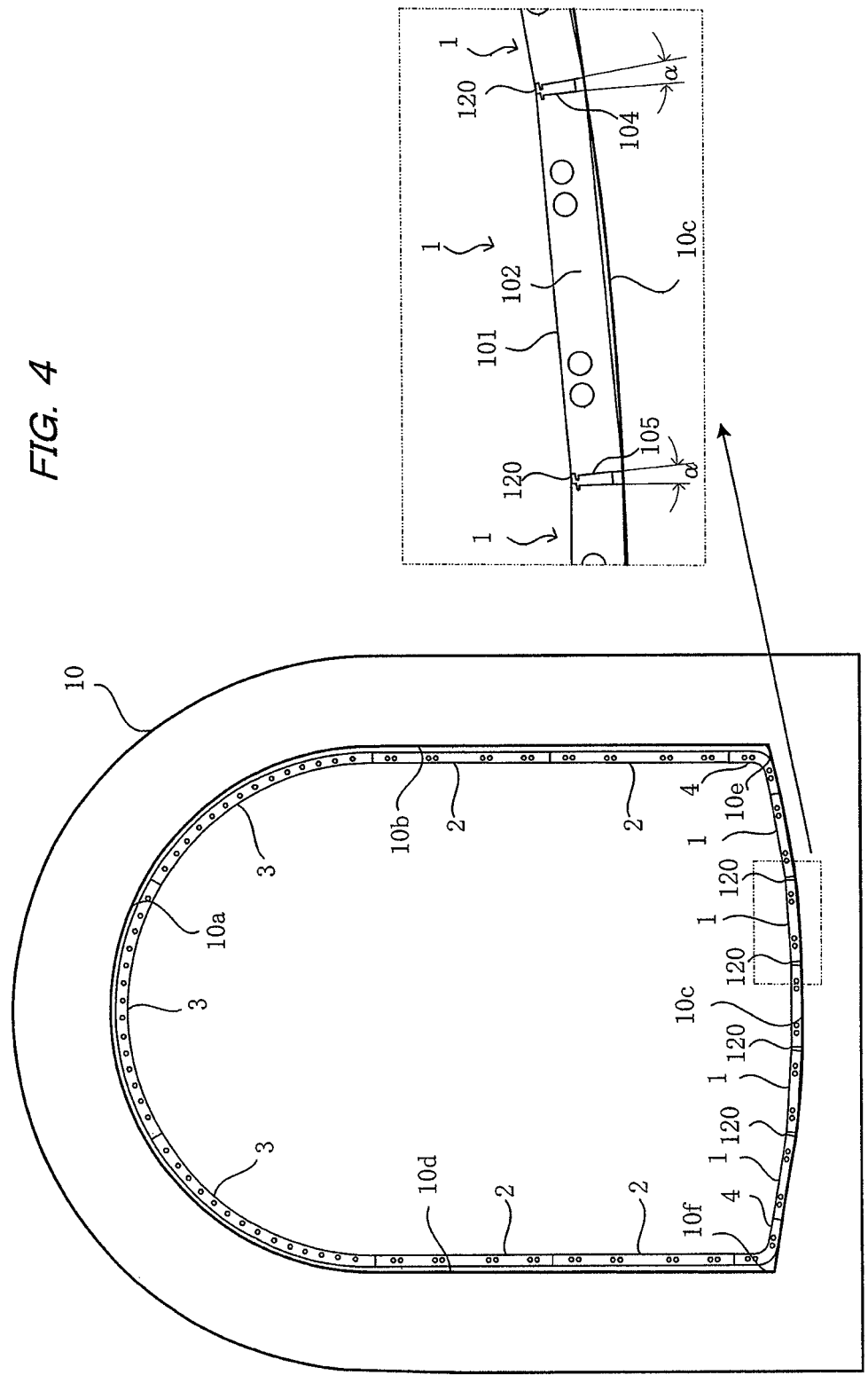
FIG. 4 is a front view of a rehabilitation pipe that is installed inside a pipeline.
Figure 5:
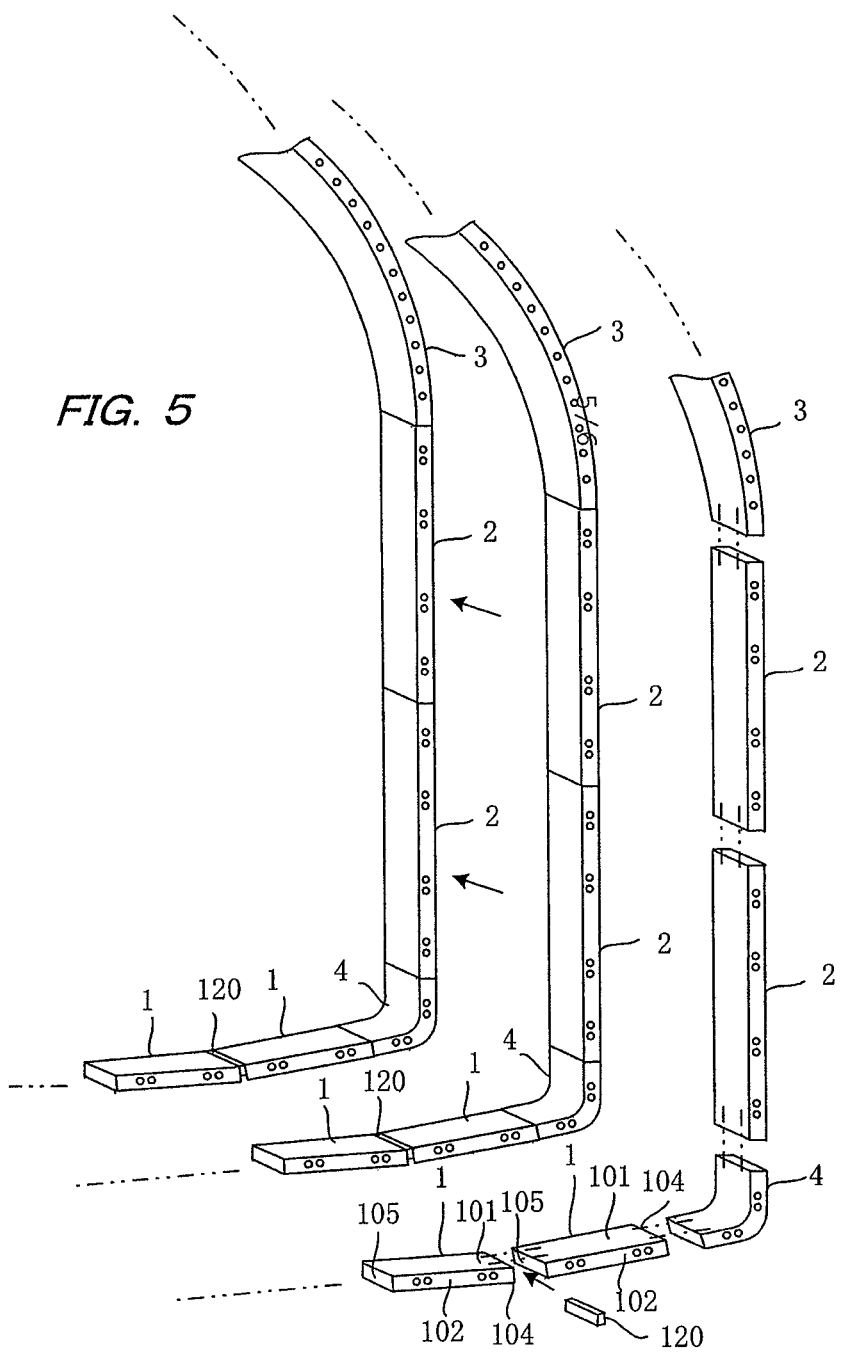
FIG. 5 is an illustrative view showing a state in which segments of various shapes are used to assemble a rehabilitation pipe.
Figure 6:
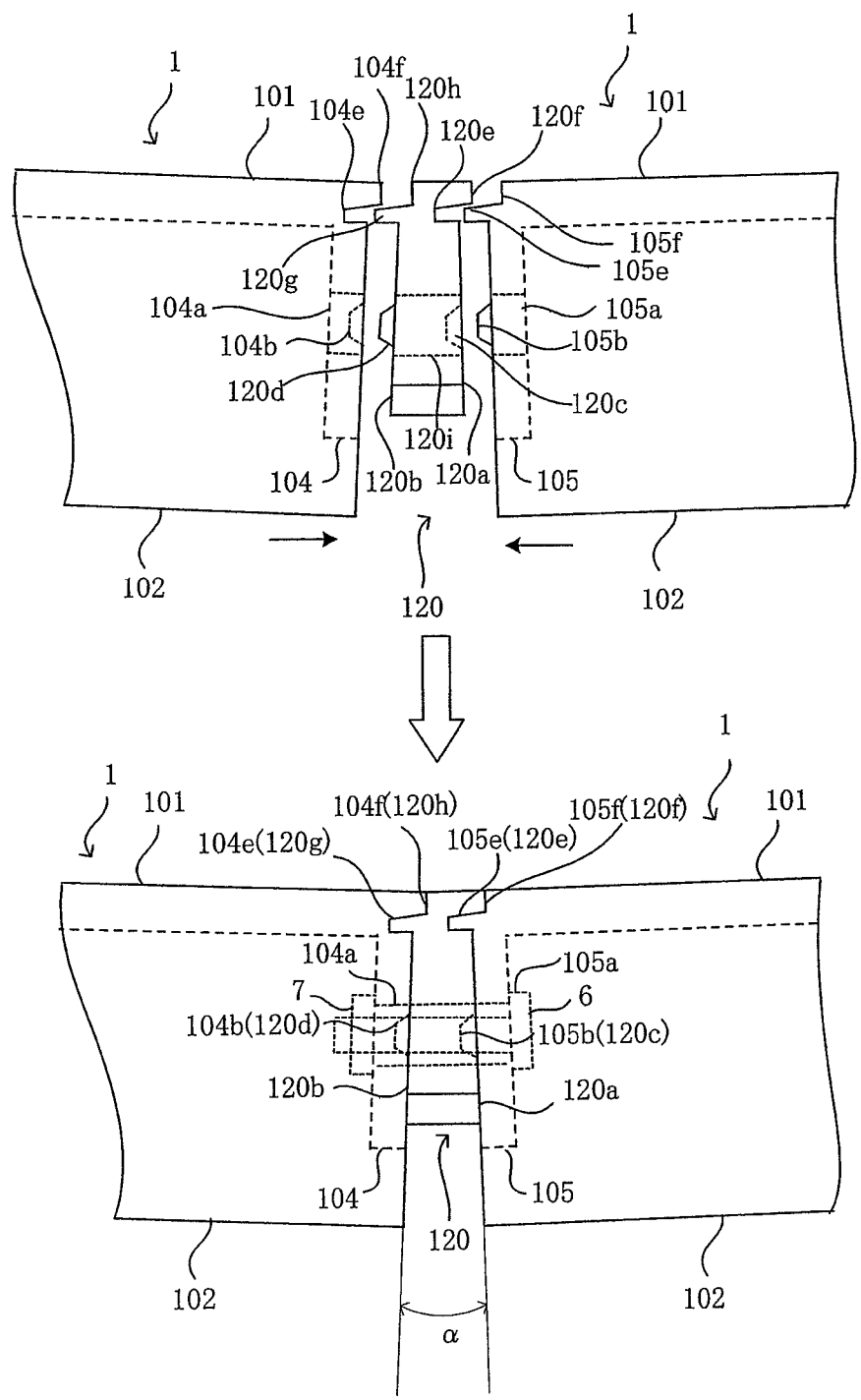
FIG. 6 is an illustrative view showing a step of linking segments in the circumferential direction using a spacer.

Referring to FIGS. 4 through 6, a description will now be given for a method for assembling inside an existing pipe a rehabilitation pipe having different curved portions using the segments and the spacer configured as described.

FIG. 4 shows an existing pipe 10 to be rehabilitated, which, as viewed in cross-section orthogonal to the pipe-length direction, has concavely curved portions 10a, 10c, straight portions 10b, 10d and bent portions 10e, 10f.

The curved portion 10a is rehabilitated using an arc-shaped segment 3 having 60° arc that divides the circumference into sixths, as described in JP-A 2014-77261. The curved portion 10c is slightly curved, as compared with the curved portion 10a, and is rehabilitated using the rectangular parallelepiped segment 1 as shown in FIG. 1 and the spacer 120. The straight portions 10b, 10d are respectively rehabilitated using a rectangular parallelepiped segment 2 that is similar to the segment 1 and about twice as long in the circumferential direction as the segment 1. The bent portions 10e, 10f are rehabilitated using a segment 4 that has end plates the same as the end plates 104, 105 of the segment 1 and has an inner surface plate, side plates and inner plates that are respectively bent so as to have a curved right angle.

FIG. 5 shows a step of linking the segments 1 to 4 in the circumferential and pipe-length directions.

As shown on the right side in FIG. 5, the respective end plates of the segments 3, 2, 2, 4 and 1 are aligned from top to bottom and tightened using bolts and nuts, thereby linking these segments in the circumferential direction.

The curved portion 10c has a small arc curvature, and using the standard arc-shaped segment 3 makes rehabilitation difficult. Therefore, as shown in FIG. 6, the spacer 120 is interposed between the rectangular parallelepiped segments 1 for linkage in the circumferential direction to rehabilitate the curved portion 10c.

In FIG. 6, the spacer 120 is inserted between the end plates 104, 105 of the two segments 1, 1 so that the concave sections 104b, 104e and the convex section 104f formed at the end plate 104 of the one segment 1 are aligned with the convex sections 120d, 120g and the concave section 120h formed at the contact surface 120b of the spacer 120, and the convex sections 105b, 105e and the concave section 105f formed at the end plate 105 of the other segment 1 are aligned with the concave sections 120c, 120e and the convex section 120f formed at the contact surface 120a of the spacer 120.

The convex sections and the corresponding concave sections that are respectively aligned are then fitted into each other, and the end plates 104, 105 of the two segments 1, 1 are respectively brought into contact with the contact surfaces 120b, 120a of the spacer 120, as shown in the lower portion in FIG. 6. In this state, a bolt 6 is inserted from the insertion hole 105a of the end plate 105 through the insertion hole 120i of the spacer 120 into the insertion hole 104a of the end plate 104, and a nut 7 is then threadedly engaged to the bolt 6, thereby tightening and linking both the segments 1, 1 in the circumferential direction.

The four segments 1 at the curved portion 10c of the existing pipe 10 as shown in FIG. 4 are linked with the spacers 120 interposed therebetween. Therefore, as shown in an enlarged state in FIG. 4, there is less space between the upper side of the side plate 102 of the segment 1 (lower side in FIG. 4) and the curved portion 10c, thus providing an effect similar to that obtained when arc-shaped segments having an arc corresponding to the gentle arc of the curved portion 10c are linked in the circumferential direction.

The angle α of inclination of the contact surfaces 120a, 120b of the spacer 120 is determined depending on the curvature of the curved portion of the existing pipe, the length of the segment 1 in the circumferential direction, and the like. For example, for curved portions having large curvature (small radius of curvature) and large degree of curvature, or for segments having long length in the circumferential direction, the inclination of the contact surfaces 120a, 120b is made large to increase the angle α of inclination. Such measures allow the curvature obtained by linking the segments 1 in the circumferential direction using the spacer 120 to be fitted more effectively to the curvature of the curved portion of the existing pipe.

Once all the segments are linked in the circumferential direction, a ring-shaped pipe is assembled as shown in the middle portion in FIG. 5. The segments of the ring-shaped pipe are then linked in the pipe-length direction to the segments of the ring-shaped pipe at the left in FIG. 5 that have already linked in the circumferential direction. Such a linkage of the segments in the pipe-length direction is performed by threadedly engaging a bolt-like linking member from one segment into a nut mounted on the other segment and tightening both the segments, as disclosed in JP-A 2011-12803 and JP-A 2014-77261.

After all the segments are linked in the pipe-length direction and a rehabilitation pipe is installed inside the existing pipe 10, grout or another filler material is injected into a space between the existing pipe and the rehabilitation pipe and hardened, thereby constructing a composite pipe comprising the existing pipe and the rehabilitation pipe.

The spacer as described above may also be used as a diameter expander and inserted between standard segments when they are linked in the circumferential direction in order to enlarge the pipe diameter of a rehabilitation pipe that is installed inside an existing pipe using the standard segments.

What is claimed is:

1. A method for rehabilitating an existing pipe having a curved portion as viewed in cross-section orthogonal to the longitudinal direction of the existing pipe, comprising:
    preparing a plurality of segments each comprising an inner surface plate, and side plates and end plates provided upright on a peripheral edge of the inner surface plate, the inner surface plate, the side plates, and the end plates being formed integrally from a plastic material; and
    linking the segments in a circumferential direction and in a pipe-length direction to assemble a rehabilitation pipe inside the existing pipe;
    wherein, for pipe rehabilitation at the curved portion of the existing pipe, a plurality of rectangular parallelepiped segments whose inner surface plate, side plates and end plates are all rectangular are used, and a spacer is interposed between the end plates of the rectangular parallelepiped segments when they are linked in the circumferential direction, and
    wherein the spacer has a first contact surface that comes into contact with the end plate of the rectangular parallelepiped segment and a second contact surface that comes into contact with the end plate of the rectangular parallelepiped segment on the side opposite the first contact surface, both the contact surfaces are inclined relative to each other such that both intersect at a predetermined angle of inclination.

2. A method for rehabilitating an existing pipe according to claim 1, wherein the angle of inclination is determined depending on the curvature of the curved portion of the existing pipe and the length of the rectangular parallelepiped segment in the circumferential direction.

3. A method for rehabilitating an existing pipe according to claim 1, wherein the end plate of the rectangular parallelepiped segment is provided with concave and convex sections along the entire length in the pipe-length direction, and the spacer is provided at the first and second contact surfaces with convex and concave sections that respectively fit into the concave and convex sections formed at the end plate of the rectangular parallelepiped segment.

* * * * *